(12) United States Patent
van Gent et al.

(10) Patent No.: US 10,313,464 B2
(45) Date of Patent: ***Jun. 4, 2019

(54) TARGETED NOTIFICATION OF CONTENT AVAILABILITY TO A MOBILE DEVICE

(71) Applicant: Seven Networks, LLC, Marshall, TX (US)

(72) Inventors: Robert Paul van Gent, Redwood City, CA (US); Ido Ariel, Tel Aviv (IL)

(73) Assignee: Seven Networks, LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,057

(22) Filed: May 15, 2016

(65) Prior Publication Data

US 2016/0337463 A1 Nov. 17, 2016

Related U.S. Application Data

(63) Continuation of application No. 14/872,072, filed on Sep. 30, 2015, now Pat. No. 9,369,424, which is a
(Continued)

(51) Int. Cl.
*H04L 12/58* (2006.01)
*H04L 29/08* (2006.01)
(Continued)

(52) U.S. Cl.
CPC ............... *H04L 67/26* (2013.01); *G06F 7/00* (2013.01); *G06F 16/958* (2019.01);
(Continued)

(58) Field of Classification Search
CPC .... G06Q 10/109; G06Q 10/107; G06Q 10/10; G06Q 30/02; G06Q 30/0269;
(Continued)

(56) References Cited

U.S. PATENT DOCUMENTS 6,269,369 B1 7/2001 Robertson
7,580,919 B1 8/2009 Hannel et al.
(Continued)

OTHER PUBLICATIONS

USPTO, Final Office Action in U.S. Appl. No. 13/372,145 dated Dec. 14, 2016.
(Continued)

*Primary Examiner* — Jungwon Chang
(74) *Attorney, Agent, or Firm* — NK Patent Law

(57) ABSTRACT

A system includes a first computing device client associated with a first user in a community of users operable to send content to publish to a data aggregation server. The data aggregation server is operable to receive the content to publish from the first computing device client, host a first user profile associated with the first user of the first computing device client, the first user profile identifying a targeted recipient in the community of users, and disseminate automatically the content received from the first computing device client to a second computing device client associated with the targeted recipient, without receiving input from the first computing device client explicitly specifying the targeted recipient to whom the content is disseminated.

14 Claims, 4 Drawing Sheets

Related U.S. Application Data continuation of application No. 13/030,023, filed on Feb. 17, 2011, now abandoned, which is a continuation of application No. 11/925,964, filed on Oct. 28, 2007, now Pat. No. 7,917,505, which is a continuation of application No. 11/303,048, filed on Dec. 14, 2005, now Pat. No. 8,468,126, which is a continuation of application No. 11/229,340, filed on Sep. 16, 2005, now Pat. No. 7,917,468, which is a continuation of application No. 11/217,203, filed on Aug. 31, 2005, now Pat. No. 7,853,563.

(60) Provisional application No. 60/704,781, filed on Aug. 1, 2005.

(51) Int. Cl.
| | |
|---|---|
| *G06F 16/958* | (2019.01) |
| *G06Q 10/10* | (2012.01) |
| *G06Q 30/02* | (2012.01) |
| *G06F 7/00* | (2006.01) |
| *G06Q 50/00* | (2012.01) |
| *H04W 4/21* | (2018.01) |
| *H04L 29/06* | (2006.01) |
| *H04W 48/08* | (2009.01) |
| *G06F 17/00* | (2019.01) |
| *H04W 88/02* | (2009.01) |

(52) U.S. Cl.
CPC ........... *G06Q 10/109* (2013.01); *G06Q 30/02* (2013.01); *G06Q 50/01* (2013.01); *H04L 51/046* (2013.01); *H04L 51/16* (2013.01); *H04L 51/24* (2013.01); *H04L 51/36* (2013.01); *H04L 51/38* (2013.01); *H04L 67/306* (2013.01); *H04W 4/21* (2018.02); *G06F 17/00* (2013.01); *G06Q 30/0269* (2013.01); *H04L 51/00* (2013.01); *H04L 51/10* (2013.01); *H04L 51/14* (2013.01); *H04L 51/32* (2013.01); *H04L 65/403* (2013.01); *H04L 67/42* (2013.01); *H04W 48/08* (2013.01); *H04W 88/02* (2013.01)

(58) Field of Classification Search
CPC ......... G06Q 50/01; H04L 67/32; H04L 51/12; H04L 63/126; H04L 67/26; H04L 67/306; H04L 67/42; H04L 51/16; H04L 51/24; H04L 51/36; H04L 51/38; H04L 51/046; H04L 51/32; H04L 51/14; H04L 51/10; H04L 51/00; H04L 65/403; G06F 17/00; G06F 7/00; G06F 16/958; H04W 88/02; H04W 4/21; H04W 48/08
USPC ............... 709/204–206, 221, 223; 340/573.1
See application file for complete search history.

(56) References Cited

U.S. PATENT DOCUMENTS

| | | | | |
|---|---|---|---|---|
| 7,680,770 | B1* | 3/2010 | Buyukkokten | G06Q 10/10 340/573.1 |
| 2001/0021929 | A1 | 9/2001 | Lin et al. | |
| 2002/0188609 | A1* | 12/2002 | Fukuta | G06Q 10/10 |
| 2003/0028596 | A1 | 2/2003 | Toyota et al. | |
| 2003/0055937 | A1* | 3/2003 | Matsushima | G06Q 10/10 709/223 |
| 2003/0069874 | A1* | 4/2003 | Hertzog | G06Q 10/109 |
| 2003/0130882 | A1* | 7/2003 | Shuttleworth | G06Q 10/109 709/204 |
| 2003/0135565 | A1* | 7/2003 | Estrada | G06Q 10/107 709/206 |
| 2003/0187813 | A1 | 10/2003 | Goldman et al. | |
| 2003/0233399 | A1 | 12/2003 | Prohel et al. | |
| 2004/0107283 | A1 | 6/2004 | Paddon | |
| 2004/0128371 | A1* | 7/2004 | Park | H04L 29/06 709/221 |
| 2005/0039054 | A1 | 2/2005 | Satoh et al. | |
| 2005/0102257 | A1 | 5/2005 | Onyon et al. | |
| 2005/0108359 | A1 | 5/2005 | Hyder et al. | |
| 2005/0182745 | A1 | 8/2005 | Dhillon et al. | |
| 2005/0198305 | A1* | 9/2005 | Pezaris | H04L 51/12 709/227 |
| 2005/0209999 | A1 | 9/2005 | Jou | |
| 2005/0210104 | A1 | 9/2005 | Torvinen | |
| 2005/0278307 | A1 | 12/2005 | Battagin et al. | |
| 2006/0036685 | A1* | 2/2006 | Canning | H04L 67/32 709/204 |
| 2006/0052091 | A1 | 3/2006 | Onyon et al. | |
| 2006/0075349 | A1* | 4/2006 | Gay | H04L 63/126 715/751 |
| 2007/0016553 | A1 | 1/2007 | Dumais et al. | |
| 2007/0111794 | A1 | 5/2007 | Hogan et al. | |
| 2007/0199059 | A1 | 8/2007 | Takehi | |
| 2007/0199905 | A1 | 8/2007 | Piper | |
| 2008/0005064 | A1 | 1/2008 | Sarukkai | |
| 2008/0228746 | A1 | 9/2008 | Markus et al. | |
| 2009/0293079 | A1 | 11/2009 | McKee et al. | |
| 2011/0141974 | A1 | 6/2011 | Lieberman | |
| 2013/0124229 | A1 | 5/2013 | Cashman et al. | |
| 2013/0325517 | A1 | 12/2013 | Berg | |

OTHER PUBLICATIONS

Peter Saint-Andre: "Extensible Messaging and Presence Protocol (XMPP): Core", Jabber Software Foundation, Oct. 2004, available at https://tools.ietf.org/html/rfc3920.

Peter Saint-Andre: "Extensible Messaging and Presence Protocol (XMPP): Instant Messaging and Presence", Jabber Software Foundation, Oct. 2004, available at https://tools.ietf.org/html/rfc3921.

USPTO, Non-Final Rejection in U.S. Appl. No. 14/623,522 dated Oct. 11, 2017.

USPTO, Final Rejection in U.S. Appl. No. 15/247,848 dated Jul. 26, 2017.

USPTO, Final Office Action in U.S. Appl. No. 14/623,522 dated May 21, 2018.

USPTO, Non-Final Office Action in U.S. Appl. No. 15/247,848 dated Feb. 15, 2018.

USPTO, Final Rejection in U.S. Appl. No. 13/372,145 dated Nov. 30, 2017.

USPTO, Final Office Action in U.S. Appl. No. 15/247,848 dated Jul. 2, 2018.

USPTO, Non-Final Rejection in U.S. Appl. No. 15/827,236 dated Aug. 24, 2018.

\* cited by examiner

TARGETED NOTIFICATION OF CONTENT AVAILABILITY TO A MOBILE DEVICE

CROSS-REFERENCE TO RELATED APPLICATION(S)

This application is a continuation of U.S. patent application Ser. No. 14/872,072, filed Sep. 30, 2015, entitled "TARGETED NOTIFICATION OF CONTENT AVAILABILITY TO A MOBILE DEVICE," which is a continuation of U.S. patent application Ser. No. 13/030,023, filed Feb. 17, 2011, entitled "TARGETED NOTIFICATION OF CONTENT AVAILABILITY TO A MOBILE DEVICE,' which is continuation of U.S. patent application Ser. No. 11/925,964, filed Oct. 28, 2007 and entitled "DATA PUBLISHING," which is a continuation and claims the priority benefit of U.S. patent application Ser. No. 11/303,048 filed Dec. 14, 2005 and entitled "PUBLISHING DATA IN AN INFORMATION COMMUNITY," which is a continuation-in-part and claims the priority benefit of U.S. patent application Ser. No. 11/229,340 filed Sep. 16, 2005 and entitled "LINKING OF PERSONAL INFORMATION MANAGEMENT DATA," which is a continuation-in-part and claims the priority benefit of U.S. patent application Ser. No. 11/217,203 filed Aug. 31, 2005 and entitled "UNIVERSAL DATA AGGREGATION," (now U.S. Pat. No. 7,853,563, issued Dec. 14, 2010) which claims the priority benefit of U.S. Provisional Patent Application No. 60/704,781 filed Aug. 1, 2005 and entitled "NETWORKED PERSONAL INFORMATION MANAGEMENT." The disclosure of these commonly owned priority applications is incorporated herein by reference.

The present application is also related to U.S. patent application Ser. No. 10/339,368 filed Jan. 8, 2003 and entitled "CONNECTION ARCHITECTURE FOR A MOBILE NETWORK." The present application is further related to U.S. patent application Ser. No. 10/339,369 filed Jan. 8, 2003 and entitled "SECURE TRANSPORT FOR MOBILE COMMUNICATION NETWORK". The disclosure of these commonly owned related applications is incorporated herein by reference.

TECHNICAL FIELD

The present invention relates to control and utilization of personal information management (PIM) data such as calendar and contact information and other types of information in the general context of personal and professional activities. More specifically, the present invention relates to publishing data amongst a community of users.

BACKGROUND

Presently available groupware applications and other related collaboration products that facilitate shared work and access to documents and information (e.g., data pools) are, to a certain extent, 'closed networks.' That is, certain information cannot be shared amongst users of different groupware products because the protocols setting forth the rules and standards by which communication of data takes place are different. For example, an individual using Microsoft® Outlook® as an e-mail client via a Microsoft® Exchange® Server can exchange e-mail messages with an individual using a Lotus® Notes client via an IBM® Lotus® Domino Server. Those same users cannot, however, access the contact or calendar data of one another due to protocol differences between an Exchange® Server and a Domino Server.

There have been some software applications that have attempted to bridge the protocol gap such as the Trillian instant messaging (IM) client from Cerulean Studios. Trillian is a multi-protocol chat client that supports AOL® Instant Messenger, ICQ®, MSN® Messenger, Yahoo! ® Messenger and IRC through a single interface by enabling simultaneous connections to existing instant messaging networks via a direct connection to whatever servers actually power the messaging network. Trillian, however, cannot share most types of corporate or personal data as it is limited to Instant Messaging.

Day-to-day life—as evidenced by the advent of such technologies like Instant Messaging—has become increasingly digitally interactive with a need and desire to share or 'publish' various types of information with others. Business relationships, for example, are the result of networking and referrals whereby access to information concerning certain persons or businesses has become critical. Personal relationships, too, are more global thereby requiring access to some sort of networked digital communication medium in order to bridge the thousands of miles that might separate individuals or communities.

Even with e-mail, facsimile, courier and express mail services, the sharing or publication of data can be delayed by hours or days. Hours can often mean the difference between closing a deal or losing a deal to a possible competitor. Similar delays can leave friends and family 'out-of-touch' with other members of a community. For example, a relative in Europe may not know of, for example, a birth or death in the family that occurred thousands of miles away in the United States.

There is, therefore, a need for a system that allows for the aggregation and access of all types of data in a centralized manner notwithstanding network protocols or other proprietary limitations. Through the aggregation of this data in a centralized manner, the data can then be shared or published amongst a community of users in order to allow for more informed personal and professional relationships.

SUMMARY

A system and method for publishing information to a community of users is disclosed. Published information is inclusive of, for example, calendar data, blog data and photographs. Communities may be defined by PIM data or automatically generated by a data aggregation server in response to a user-defined rubric. Published information may be provided to a recipient or in conjunction with a notification delivered to the recipient. Published data may be subject to certain read/write limitations.

DETAILED DESCRIPTION

Figure 1:
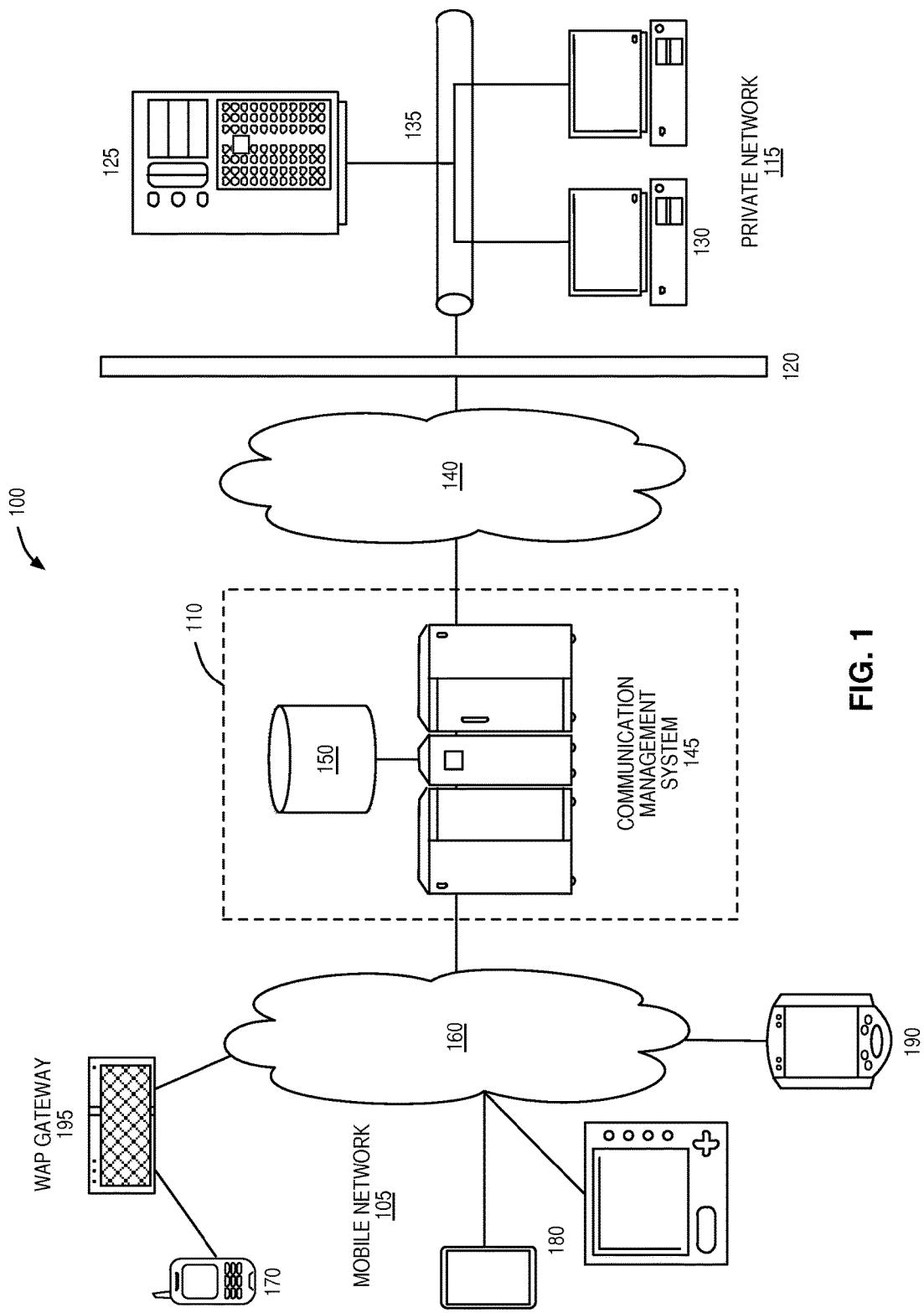
FIG. 1 is an illustration of an exemplary communication network comprising a mobile network, a communication management system and a private network.

FIG. 1 illustrates exemplary communication network architecture 100. Communication network architecture 100 comprises a mobile network 105, a communication management system 110 and a private network 115. Communication management system 110 generally manages communications between the mobile network 105 and the private network 115.

A network should be generally understood as a group of associated devices (e.g., computing devices) that are coupled to one another via a communications facility. For example, mobile network 105 is illustrative of an exemplary group of mobile computing devices such as mobile phones, smart phones, PDAs, tablet PCs and WI-FI equipped laptops. Private network 115 is illustrative of an enterprise server and various workstation clients such as that found in any number of corporate entities and businesses. Private network 115 may also be embodied as a single computer (e.g., a home computer) coupled to a series of other computing devices via an Internet connection as provided by an ISP. Mobile network 105, communication management system 110 and private network 115 may also be reflective of a network in that they reflect a variety, of computing devices coupled to one another via a variety of communications channels (e.g., mobile telephone base stations, the Internet and so forth). In that regard, networks should be interpreted as being inclusive rather than exclusive.

Private network 115 may be separated from the communication management system 110, mobile network 105 and any other networks by a firewall 120. Firewall 120 is traditionally a set of software applications located at a network gateway server (not shown) to protect the resources of the private network 115 (e.g., corporate or private data) from unauthorized users and/or malicious data entities (e.g., viruses and spy-ware) that might exist outside the private network 115. Firewall 120 may also be a security policy used with the aforementioned software application. Firewall 120, in the case of a personal computer (PC) 130, may be software directly implemented on the PC 130.

The mobile network 105 comprises a variety of mobile devices that may communicate over the Internet through, for example, a wireless or landline mobile network. A variety of mobile networks and communications channels for enabling Internet access are well known in the art.

Private network 115 may be any enterprise network, individual user network, or local computer system that maintains data for one or more users. In an exemplary embodiment, the private network 115 may comprise an enterprise server 125 configured to be accessed by multiple PCs 130. In one example, the enterprise server 125 may be a Microsoft® Exchange® server and the PCs 130 may access data such as electronic mail (e-mail) on the enterprise server 125 through a client software application (not shown) such as Microsoft® Outlook®. The enterprise server 125 can store e-mail mailboxes, contact lists, calendars, tasks, notes, or any other type of local data or electronic documents (e.g., word processing documents, PowerPoint® presentations, Excel spreadsheets). PCs 130 are coupled to the enterprise server 125 over a Local Area Network (LAN) 135, which is coupled to a Wide Area Network (WAN) 140 such as the Internet.

In some embodiments, PCs 130 may operate independently of enterprise server 125 (e.g., a home personal computer or a business enterprise without an enterprise server 125). PC 130 may comprise or be coupled to memory (not shown) to store e-mail mailboxes, contact lists, calendars, tasks, notes, or any other type of local data or electronic document that might otherwise be stored on enterprise server 125. In these embodiments, a personal client application (not shown) may also provide for communication with a management server 145 or a Personal Client Server (PCS) (not shown) coupled to the management server 145. This latter configuration would be functionality similar to an enterprise client (not shown) at the enterprise server 125 configured to allow communication with the management server 145. The particularities of a given communications architecture implementation are left to the requirements of a user, their particular network and available communications hardware and software. In that regard, the present disclosure's reference to a PCS should not be interpreted as an operational necessity but an alternative embodiment of the present invention.

Communication management system 110 comprises at least one management server 145 configured to manage transactions between mobile devices in the mobile network 105 and the private network 115. A user database 150, which may be coupled to or directly integrated with management server 145, comprises configuration information for different users. For example, the user database 150 may comprise login data for users in the private network 115 and/or mobile network 105.

Communication management system 110 may further comprise one or more Smart Device Servers (SDS) (not shown) and/or one or more of the aforementioned PCS (not shown) in addition to any other specially configured equipment that might be necessary to enable communications between the mobile network 105 and private network 115 in addition to communications within the communication management system 110. Optional SDS (not shown), for example, manages communications with particular smart mobile devices 190 (e.g., smart phones like the Treo 600) whereas an optional PCS (not shown) may manage communications with personal clients (not shown) that may reside on PC 130.

Mobile devices in the mobile network 105 may comprise cellular phones 170 comprising Wireless Application Protocol (WAP) interfaces configured to communicate with management server 145 through a WAP gateway 195. Other mobile devices may include tablet PCs, PDAs and Internet kiosks 180 or any smart mobile device 190 operating as a communication start/endpoint.

Communication channels 160 are any communication pathways that allow the aforementioned mobile devices to communicate between the mobile network 105 with the Internet and/or any other communications network. For example, communications channel 160 may be a landline, a cellular channel, an 802.11x wireless channel, satellite channels, or any combination of the above.

In an independent PC configuration, the personal client application (not shown) installed on the PC 130 establishes a data connection between the PC 130 and management server 145 over the appropriate networks (e.g., LAN 135 and WAN 140) as well as any necessary intermediate hardware or software applications that might further be necessary such as an optional PCS (not shown). The data connection between the PC 130 and management server 145, in one embodiment, is initiated by the personal client as an outbound connection, which is then authenticated by the management server 145. For example, the personal client on PC 130 may present authentication information to the management server 145, which the management server 145 may attempt to reconcile with information in the user database 150. A similar connection process may occur in the context of an enterprise server 125 with an enterprise client and a related data connection.

If the management server 145 authenticates the personal client or enterprise client, the data connection is established through firewall 120 (if applicable) to establish access with the communication management system 110, which, in some embodiments, is outside the private network 115. Management server 145, after having established the data connection may provide connection sharing information or other communication configuration parameters as might be related to an associated mobile device in the mobile network 105.

Management server 145 and the related client at the enterprise server 125 or PC 130 may then enter a quiescent mode until a transaction (e.g., the arrival of data at the server 125 or PC 130) that requires the transfer of data between the private network 115 and mobile network 105 (e.g., pushing of e-mail). In some embodiments, if the data connection is inadvertently terminated, the client at the enterprise server 125 or PC 130 will automatically reestablish a data connection with the management server 145.

The data connection may be maintained even when there is no exchange of data between the management server 145 and mobile network 105 and an associated mobile device. In one embodiment, the data connection is a Transmission Control Protocol/Internet Protocol (TCP/IP) connection although any connection protocol may be used that provides connectivity between the private network 115 and communication management system 110. Alternative embodiments may utilize a proxy server and/or a Secure Socket Layer (SSL) for the purposes of maintaining the security of information transmitted between the private network 115 and communication management system 110.

After establishing the data connection, a mobile data connection may be established between any of the mobile devices in the mobile network 105 and the management server 145. The mobile data connection may, in some embodiments, be established prior to and/or maintained notwithstanding the presence of a data connection between the private network 115 and communication management system 110. For example, a mobile device in mobile network 105 may seek to establish and maintain a connection as soon as a communication channel 160 is available that facilitates establishing that connection. The mobile data connection may further be subject to polling (e.g., accessing the communication management system 110 on a regularly scheduled basis), manual synchronization and/or the generation of or request for data at the mobile device.

The mobile connection, in some embodiments, may also be initiated by the communication management system as a result of the arrival of data at the enterprise server 125 or PC 130 that needs to be delivered to the mobile device via the communication management system 110 and appropriate communication channel 160 (e.g., arrival of e-mail to be pushed to the mobile device).

After the mobile connection is established, the mobile device 170 may access e-mail and other data (e.g., PIM data) at the enterprise server 125 or PC 130 via, for example, an enterprise client or personal client, respectively. As noted, in some embodiments, the use of an optional SDS (not shown) to establish connectivity between the communication management system 110 and a smart device 190 may be required as may an optional PCS (not shown) for establishing connectivity between communication management system 110 and PC 130.

Mobile device connection, as noted, may be initiated by a mobile device in the mobile network 105. For example, a mobile user's username and password for accessing the communication management system 110 may be established in user database 150 when the user enrolls with the communication management system 110. The user would subsequently be required to provide this information when the mobile device attempts to automatically or manually accesses the communication management system 110. A username/password combination is not necessarily required to access the management system 110 as other security credentials may be utilized to establish access.

For example, an authentication token may be established on the mobile device following the device's providing of the proper security credentials (e.g., a user name and password). That authentication token may be recognized by the communication management system 110 with regard to establishing future access so that the re-entry of a username and password is not required for subsequent access. The authentication token may be permanent or set to expire after a certain period of time or a certain number of uses. Certificate mapping (using SSL certificates), Host-IP access control (white-listing and black-listing certain IP addresses or networks) and device location may also be used to establish access to the communication management system 110. In the latter example, the position of a device may be established by access to a particular base station (in the case of a cellular device) or a GPS-transceiver may identify the position of the device. If the device is out of a specified region, the communication management system 110 may deny access (e.g., a user designates denial of access if their mobile device is taken overseas or out-of-state as that location suggests it has been stolen).

Security credentials may also be provided through a combination of various mobile identifiers, for example, Mobile Identification Numbers (MIN), International Mobile Subscriber Identity (IMSI) and Electronic Serial Number (ESN). Additional layers of security may be provided through the use of a secure hash algorithm or a Virtual Private Network (VPN). Notwithstanding the particular access methodology, the credentials are ultimately verified by the management server 145 or some related software/hardware (e.g., optional SDS (not shown)) and possibly with further regard to user information stored in the user database 150.

Similar authentication methodologies may be utilized for establishing a data connection between the communication management system 110 and a computing device in the private network 115.

Once connectivity is established by the mobile device, the user may access e-mail, files or PIM data residing at the enterprise server 125, PC 130 or in the communication management system 110 at the management server 145. Such access includes information as may be 'published' by a user of communication management system 110.

Management server 145 may be configured to reformat and render local data from the private network 115 according to the particularities of the user's mobile device in addition to functioning as a routing engine for data transactions between the mobile devices of the mobile network 105 and the private network 115.

Figure 2:
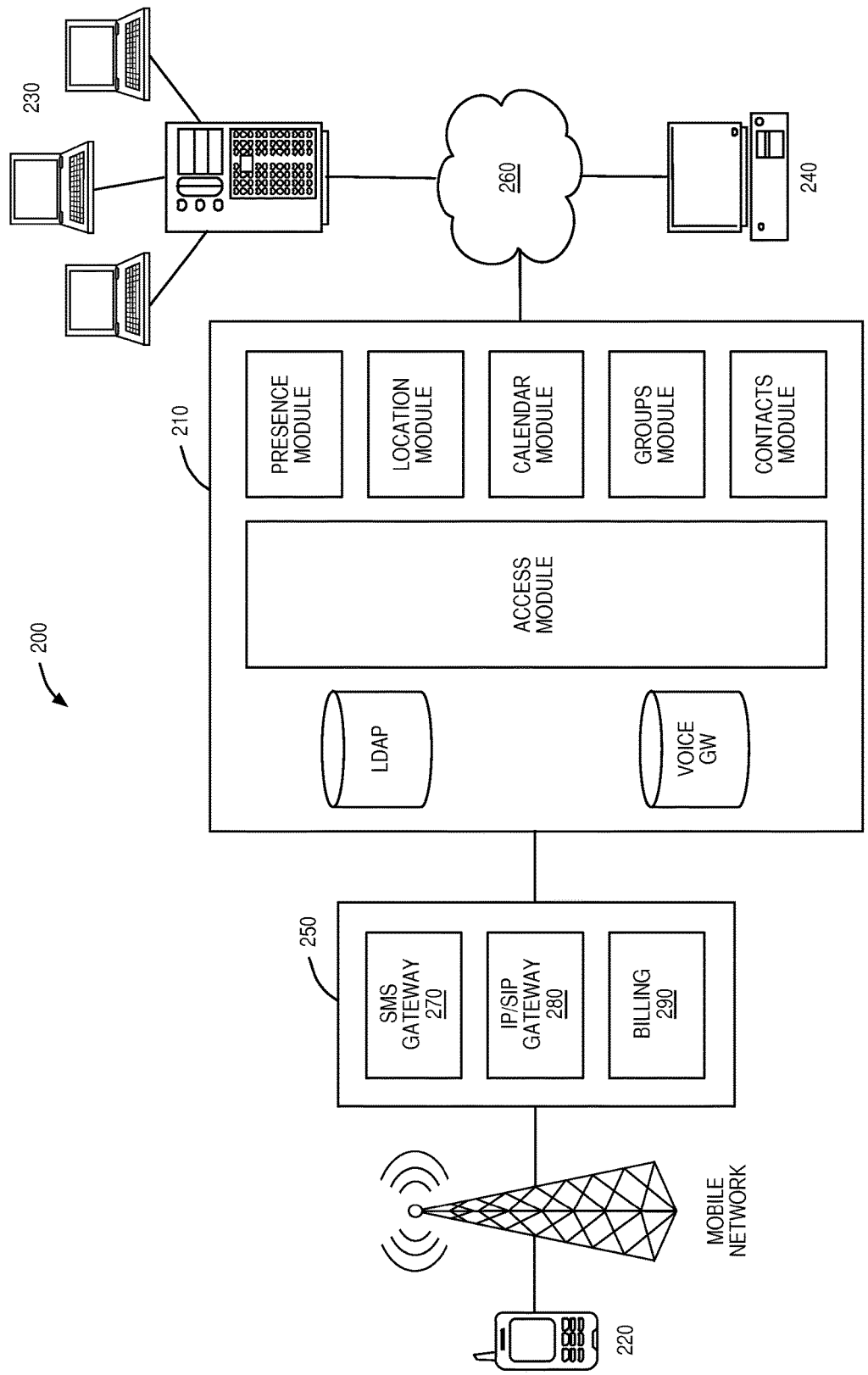
FIG. 2 is an illustration of an exemplary dynamic data aggregation and management system comprising an exemplary data aggregation server, an exemplary client device and various sources of PIM and other types of data.

FIG. 2 is an illustration of a data aggregation and management system 200 comprising an exemplary dynamic data aggregation server 210, an exemplary client device 220 and various sources of PIM and other types of data including an enterprise server 230 and a PC 240. Various intermediate operations and services 250 are also shown. The intermediate operations and services 250 may be directly integrated as a part of data aggregation server 210, may stand alone as a third-party service accessible by data aggregation server 210 and/or device 220 or be remotely coupled to the data aggregation server 210 (e.g., physically separate from the physical architecture of the data aggregation server 210); for example, a switch or customer service center.

PC 240 may be a desktop PC coupled to the data aggregations server 210 by way of client connection software like SEVEN Personal Edition available from SEVEN Networks, Inc. of Redwood City, Calif. This client connection software may provide a secure link to data stored at the PC 240 such as e-mail, personal contacts, documents or other PIM data. A client device 220 such as a smart phone or other mobile device may access this data via the data aggregation server 210 and/or a communications management system like that described in FIG. 1 and any variety of communication networks (e.g., wireless). PC 240 and its client connection software may be configured with certain features such as end-to-end encryption to ensure secure transmission of personal data or notification functionalities to inform a user that new content (e.g., e-mail) has arrived at the PC 240 and should be forwarded to client device 220 via, for example, a push operation through the data aggregation server 210 and/or a communications management system.

Enterprise server 230 may be a corporate enterprise server configured to manage e-mail, data and various applications. Enterprise server 230 (and PC 240) may utilize a firewall (not shown) like that described in FIG. 1. Although a firewall is described, a firewall is not necessary for the operation and interaction of the enterprise server 230 (or PC 240) with data aggregation server 210 and/or client device 220.

Enterprise server 230 is coupled to the data aggregation server 210 via appropriate client server software, which, like the client software of PC 240, intermediately couples the enterprise server 230 to client device 220 via a data connection to the data aggregation server 210 and/or a communications management system like that described in FIG. 1. An example of such software is SEVEN Server Edition available from the aforementioned SEVEN Networks, Inc. Additional software installed at the enterprise server 230 may provide various users (e.g., clients or workstations) the ability to interact with the enterprise server 230 and have access to application data (e.g., email), PIM data or other types of information.

Data aggregation server 210 comprises the various modules necessary to aggregate and manage PIM and other types of data. Data aggregation server 210 may be directly integrated with the management server (145) of FIG. 1 or otherwise coupled to the communication management system (110) described in FIG. 1.

Data aggregation server 210 is optionally coupled to the enterprise server 230 and/or PC 240 via network 260. Network 260 further enables communications access to additional sources of PIM and other types of data. Access to an enterprise server 230 or PC 240 by the data aggregation server 210 is not required for the operation of the data aggregation server 210. The data aggregation server 210 may operate independently of an enterprise server 230 and PC 240 so long as certain information required by the data aggregation server 210 and an associated client device 220 is otherwise available (e.g., PIM data such as calendar and/or contact data). Coupling the data aggregation server 210 to PC 240 and/or enterprise server 230 provides additional or enhanced functionality that might otherwise be unavailable absent such a coupling.

Similarly, the e-mail redirection and data access functionality offered by connection software at PC 240 and enterprise server 230 may also operate independent of the data aggregation server 210. In an embodiment of the present invention, data aggregation server 210 and PC 240 and/or enterprise server 230 may operate in parallel without ever being 'aware' of the operation of the other. Another embodiment of the present invention, however, may integrate certain features of data aggregation server 210 with enterprise server 230 and/or PC 240 to provide for the aforementioned enhanced functionality.

In an embodiment of the present invention, data aggregation server 210 may be operating on and/or integrated into with a service provider network (e.g., Cingular Wireless for wireless networking or SBC Communications, Inc. for telecommunications such as digital subscriber lines (DSL)). Through integration or operational contact with a service provider's network, instant access to a community of millions of subscribers (i.e., the service provider's customers) is provided. This integration may also allow for access to additional features such as news, media content, maps and directions as well as e-mail, Short Messaging Service (SMS) and any other value-added features as made available by the service provider. The service provider's network and the data aggregation server 210 may operate independently of or in conjunction with enterprise server architecture 230 and/or PC 240.

As noted above, the data aggregation server 210 may also be integrated with the communication management system (110) and/or management server (145) of FIG. 1. In that regard, data aggregation server 210 may be a part of the management server (145), which may be an operational part of the communications management system (110) of FIG. 1. That communication management system (110) may be a part of the aforementioned service provider network.

Data aggregation server 210 may comprise various access controls, gateways and operational modules, which are described in detail in co-pending U.S. patent application Ser. No. 11/217,203.

Intermediate operations and services 250 may comprise any variety of operations and services deemed necessary and/or desirable by a service provider. In FIG. 2, an SMS Gateway 270, IP/SIP Gateway 280 and Billing and Transaction Service 290 are illustrated. The inclusion of these particular operations and services is not to suggest their presence is a prerequisite for practice of the presently claimed invention.

SMS Gateway 270 may comprise a software and/or hardware utility enabling users to send and receive SMS messages on a GSM or PCS digital cellular network. SMS Gateway 270 may support a number of IP interfaces such as POP3 and SMTP for integration with an e-mail environment as well as HTTP/XML interfaces and SNMP traps for notification of events. SMS Gateway 270 may further support local programming interfaces such as Object Linking and Embedding (OLE), Dynamic Data Exchange (DDE) and Command Line Interface (CLI). SMS gateway 270 may be further coupled to an SMSC (not shown). A Push Gateway may be functionally integrated with SMS Gateway 270 and may further operate proxy applications such as a WAP Gateway 195 for the translation of WAP requests into HTTP requests.

An IP/SIP Gateway 280 may operate in conjunction with an SIP Stack located in device 220 to integrate the PSTN, which uses the Signaling System 7 protocol to offload PSTN data onto a wireless or broadband network.

Billing and transaction service 290 may be configured and/or utilized for calculating the minutes a user is on a network and/or the amount of bandwidth the user has consumed and how this usage pertains to a service plan and/or billing cycle. Other features that may be utilized by the user of device 220 and subject to a service fee may be calculated by billing and transaction service 290 such as SMS, roaming and 411.

Device 220, in an embodiment of the present invention, is a mobile device such as a cellular telephone configured to allow access to the data aggregation server 210 as well as various types of data at enterprise server 230 and/or PC 240. Device 220 may operate through intermediate operations and services 250 in order to access the data management server 210. Client device 220 may comprise various authentication controls and operational modules that interact with certain modules in the data aggregation server 210, the intermediate operations and service 250 as well as an enterprise server 230 and/or PC 240.

Figure 3:
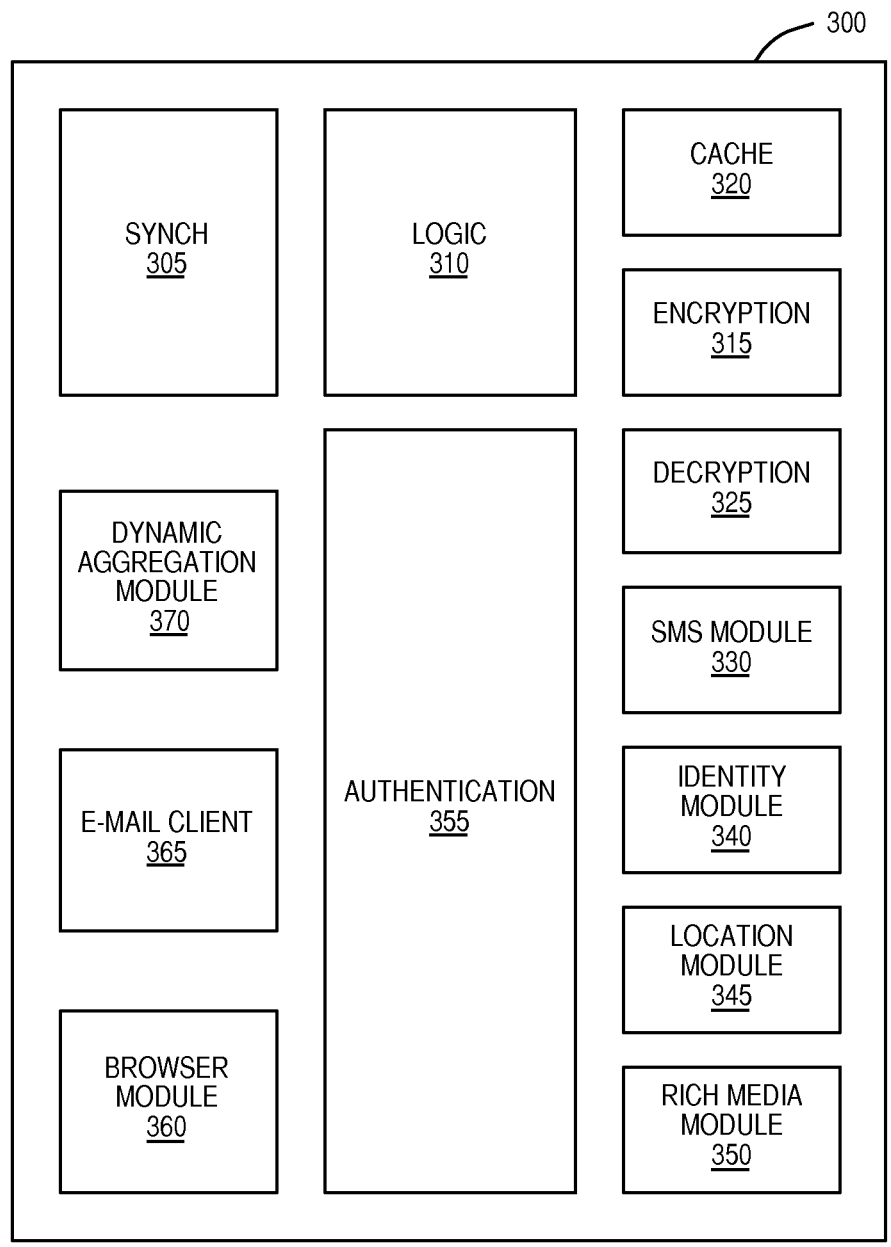
FIG. 3 is an exemplary client device allowing for access to and manipulation of dynamically aggregation personal and professional contact information.

FIG. 3 is an exemplary device 300 allowing for interaction with and manipulation of dynamically aggregated personal and professional contact information and other types of information and data. Device 300 may be any variety of exemplary portable devices as may be implemented in mobile network 105 such as a mobile phone, SmartPhone, PDA, tablet PC, WI-FI equipped laptop and so forth. Device 300 may correspond to device 220 relative the data aggregation server 210 as illustrated in FIG. 2.

Device 300 comprises various modules (e.g., synchronization module 305, logic module 310, etc.). The present device 300 is exemplary; additional or differing embodiments of the present invention may lack certain modules (e.g., location module 345) and/or may comprise additional modules such as an enhanced user interface framework as described in commonly owned and co-pending U.S. patent application Ser. Nos. 11/123,540; 11/227,013; 11/227,272; and Ser. No. 11/227,323, which are incorporated herein by reference.

Synchronization module 305 comprises or is otherwise coupled to the software, routines, hardware and/or driver devices necessary for updating or backing up data on one device with a second device. The most common instance of synchronization occurs between a mobile device (e.g., a PDA or a SmartPhone) and a desktop computer running a desktop connector or coupled to a server hosting synchronization software.

While synchronization may be the result of a physical coupling of the mobile device to the desktop computer (e.g., through a desktop cradle and cable), the pervasiveness of wireless technology (e.g., CDMA2000, 1×RTT, FOMA, GSM/GPRS, UMTS, i-Mode, MOPERA, EDGE, WCDMA, Bluetooth and Wi-Fi) and related devices as well as improvements in encryption technology (e.g., AES 128-, 192- and 256-bit keys) now allow for synchronization to occur wirelessly while a user of the mobile device is away from their office. Physical presence of the synchronizing device with the synchronized device is no longer required.

Various improvements in 'push' and 'pull' technology further allow for more than mere 'backing up' of data through a synchronization operation but also to receive and retrieve data in real-time. For example, SEVEN Server Edition provides end-users with real-time access to corporate and personal data such as Microsoft Exchange, Lotus Domino, IMAP4 and POP3 email; calendar; corporate directories; personal contacts; and documents.

Logic module 310 comprises or is otherwise coupled to the software, routines, hardware and/or driver devices necessary for data manipulation and control functions. In the case of hardware, logic module 310 is comprised of circuits that perform an operation. In the case of software, logic module 310 is the sequence of instructions in a program; Logic module 310 may be comprised of hardware and software, only software or only hardware. Further, the hardware of logic module 310 may implement the software of logic module 310. Certain software in the logic module 310 may be implemented by other modules or hardware components of device 300.

Encryption module 315 and decryption module 325 are responsible for the encryption and decryption, respectively, of data exchanged between, for example, device 300 and communication management system 110 and/or data aggregation server 210. Encryption module 315 and decryption module 325 may, in some embodiments of the present invention, operate in conjunction with other modules such as authentication module 355 to allow for encryption of authentication information related to network and service access. In other embodiments, encryption and decryption modules 315/325 may be a single module. In still other embodiments of the present invention, the encryption and decryption modules 315/325 may be utilized for the purposes of exchanging data and information directly between mobile devices, for example, between Bluetooth enabled mobile devices utilizing the JSR-82 API, which is incorporated herein by reference.

An example of an encryption algorithm that may be utilized by encryption and decryption module 315 and 325, respectively, is the 128-bit Advanced Encryption Standard (AES), which is based on Federal Information Processing Standard (FIPS) 197. The disclosure of the PIPS 197 is incorporated herein by reference. Another encryption methodology within the scope of the present invention, specifically encryption/decryption modules 315/315, is the Diffie-Hellman (DH) secret-key negotiation (sometimes referred to as the Diffie-Hellman-Merkle key exchange). The algorithm for DH secret-key negotiation is disclosed in U.S. Pat. No. 4,200,770, the disclosure of which is incorporated herein by reference. DH secret-key negotiation is a cryptographic protocol that allows two parties to agree on a secret key for use over an insecure communications channel; the key can then be used to encrypt subsequent communications using a symmetric key cipher.

In an embodiment of the present invention, various data types are exchanged between the device 300 and, for example, communication management system 110, which may include dynamically aggregated PIM and other types of data as aggregated by, for example, dynamic aggregation server 210. Such data, when being transmitted from device 300, may be encrypted by encryption module 315 using 128-bit AES or DH secret-key negotiation. Similar methodologies and algorithms may be used to decrypt received information by device 300 and decryption module 325.

In some embodiments of the present invention, encryption/decryption modules 315/325 may further prevent the storage or write-to-disk (e.g., proxy caching) of transmitted/received data to further improve security whereby no one but authorized users can read or access data.

Additional embodiments of the prevent invention may provide for the encryption module 315 to obliterate data stored on the device 300 or 'lock-down' the device 300 should a user of device 300 report device 300 stolen or initiate an obliteration or lock-down command from communication system 110, server 125, or PC 130.

Establishing end-to-end encryption may comprise the submission of security credentials upon initial registration of a device 300 with communication management system 110. These credentials may be used to later authenticate the user and provide access to appropriate data and resources at the communication management system 110. In an embodiment of the invention, these security credentials are not stored outside of the system 110 architecture in order to further improve security.

In one embodiment of the present invention, and as referenced in the context of FIG. 1, during the registration process, a unique, encrypted authentication token is exchanged between the device 300 and communication system 110 whereby the user of the device 300 will be able to access resources at the communication system 110 without being required to submit credentials upon each subsequent login. Security credentials may be enabled by the user of the device 300 and/or communication system 110 or by an IT administrator who may set various security policies for the device 300, communication system 110 and/or related network.

For example, an administrator may implement a username/password policy whereby users are required to login using a name and password. Administrators may also enable or disable a browser mode wherein users may be able to access data not only through a mobile device 300 but also through a secure Internet web browser utilizing, for example, 128-bit SSL encryption. Certain policies (e.g., user name and password) may also be made time sensitive whereby a login expires every 'X' days. Administrators may also control the obliteration of data in devices 300 in the instance that a device 300 with access to behind-the-firewall data is lost or stolen.

In another embodiment of the present invention, encrypted data transmitted to and/or received from mobile device 300 may utilize digital signature algorithms such as SHA-1, a secure hash algorithm, as disclosed in FIPS 180-2, the disclosure of which is incorporated herein by reference. The use of a digital signature algorithm provides additional protection against the modification of data as it passes through a network, even though the data is independently encrypted (e.g., using AES).

In yet another embodiment of the present invention, encrypted data transmitted to and/or received from mobile device 300 may further utilize a multichannel encryption protocol whereby a single block of data comprises multiple separately encrypted sections, each destined for a different endpoint. For example, a block of data may comprise a header section, which is accessed for routing purposes and a body section, which comprises several e-mail messages destined for the device 300. Each section of data may be encrypted with a separate key whereby the routing information may be decrypted without requiring access to the e-mail message data.

In still another embodiment of the present invention, a Virtual Private Network (VPN) may be utilized adding yet another layer of security on top of a SSL. These various embodiments may be implemented individually, collectively, or in a piece-meal fashion depending upon the particular security concerns of the data accessed and generated by device 300.

Application cache 320 comprises or is otherwise coupled to the software, routines, hardware and/or driver devices necessary for storing application data in memory as opposed to constantly looking up, loading, reading and executing the application data from another location. Application cache 320 helps improve the processing speed of device 300.

Application cache 320 may be configured so that every time data is instantiated or called, the data is time-stamped. A clean-up process will occasionally remove all instances of data that are beyond a certain age as reflected by the time-stamp. By time-stamping and removing stale data, there is increased certainty that the cache 320 and the data that would otherwise be called from its native environment are synchronized. Data stored in application cache 320 may, if necessary, be manually removed. Such manual deletion may be required in instances where data is in error or has otherwise been corrupted and is preventing proper synchronization. SMS module 330 comprises or is otherwise coupled to the software, routines, hardware and/or driver devices necessary for initiating a push or pull synchronization operation in response to the receipt of an SMS message, which may include interaction with the synchronization module 305.

For example, an SMS message is sent from a mobile device or an SMS-gateway website and received at a network operator's Short Message Service Center (SMSC). The SMS message is then stored and forwarded from the SMSC to the recipient mobile device. If the recipient device is off or out of range, the SMS message is stored at the SMSC and delivered at the next possible opportunity or until it expires as determined by network and/or SMSC settings.

In addition to sending messages, SMS can be used to transport data to a handset; for example, ring tones and operator logos. In conjunction with the Wireless Application Protocol that allows for Internet access from a mobile device and the General Packet Radio Service, configuration data for a particular device can be delivered via an SMS message (e.g., allowing for remote configuration of a WAP browser by a service provider or mobile operator).

SMS messages may also be used to indicate the receipt of new voice mail or e-mail messages on a mobile device. SMS functionality is also of particular benefit in the context of data synchronization, especially real-time access to e-mail or other data.

Many prior art synchronization systems merely provide for a regularly scheduled synchronization (e.g., every 15 minutes) in order to limit the consumption of bandwidth and/or to preserve battery life on the client device. Such a synchronization schedule deprives the mobile client user of real-time access to their data as exemplified by the arrival of a critical message or posting of information to a blog or other information depository, just seconds after the completion of a timed-synchronization operation.

Through the use of an SMS message, the arrival or publication of new email or data that meets user specified qualifications (e.g., sender, importance, subject content, message content, etc.) may result in the generation of an SMS message that is delivered to the device 300. The SMS module 330, upon receipt and processing of the SMS message and any instructive or identifying data contained therein, may initiate a synchronization operation in conjunction with the synchronization module 305. For example, upon receipt of an SMS message from a server or other computer associated with device 300, the SMS module 330 may instruct the synchronization module 305 to begin a synchronization operation with the server or associated computer.

Initiation of the synchronization operation may be governed, however, by certain limitations of the device 300. For example, if the user of the device 300 is presently engaged in a telephone call, the synchronization operation will not take place. Further, if the user is engaged in a high-bandwidth operation (e.g., receiving streaming media) or is low on battery power, the device 300 may not effectuate the synchronization operation. Such governance may be under the control of SMS module 330, synchronization module 305 and/or other components of the device 300 (e.g., logic module 310).

Identity module 340 comprises or is otherwise coupled to the routines, hardware, driver devices and various device identification tools that may be used to control access to various communications networks and utilization of certain services by the device 300. For example, identity module 340 may be comprised of an Advanced Intelligent Network sub-module (not shown) allowing for access to the Advanced Intelligent Network (AIN). The AIN is a switched voice and data network architecture comprising a variety of network elements allowing for open, interfaced, multi-vendor, telecommunication capabilities. Through these various capabilities, phone companies and service providers are able to define and customize, test and introduce service offerings such as multimedia messaging and cell routing. The AIN, by further example, allows a wireless user to make and receive phone calls while 'roaming.'

Optional location module 345 comprises or is otherwise coupled to the routines, hardware—including a GPS receiver (not shown)—and driver devices necessary for GPS functionality in a GPS-equipped device. Signals emitted by GPS satellites arrive at a GPS receiver in the device 300 whereby the GPS receiver can calculate its location in relation to GPS satellite transmissions through a process known as trilateration. Through trilateration, a GPS receiver measures the distance from the GPS satellite using travel time of the GPS satellite signals and thereby pinpoints the physical location of the GPS receiver.

Optional location module 345 may further comprise the Assisted Global Positioning System (A-GPS). A-GPS uses a combination of GPS satellites and cellular phone base stations to pinpoint location of the mobile device and its GPS receiver and to offer a determination of location that is more accurate than GPS alone. Mobile device GPS receivers, in correlation with an estimate of the mobile handset's location as determined by a cell-sector, can predict with greater accuracy the GPS signal the handset will receive and send that information to the mobile device handset. With this assistance, the size of the frequency search space is reduced and the time-to-first-fix of the signal is reduced from minutes to seconds. A-GPS handset receivers can also detect and demodulate signals that are weaker in magnitude than those required by a traditional GPS receiver. The interaction of A-GPS in a synchronized network or with an assistance server (not shown) in an asynchronous network is generally known in the art.

Rich media module 350 comprises or is otherwise coupled to the software, routines, hardware and/or driver devices necessary for enabling rich media in device 300. Rich media includes, but is not limited to, scalable vector graphics, streaming video, animation and Multimedia Messaging Service (MMS). MMS enables the creation, delivery and receipt of text messages that also include an image, audio, and/or video clip. MMS messages may be sent from one mobile device to another or to an e-mail address. MMS generally uses the Synchronized Multimedia Integration Language (SMIL) to define the layout of multimedia content. SMIL is a markup language allowing for the separate access of audio, video and images followed by their subsequent integration and playback as a synchronized multimedia presentation.

Authentication module 355 comprises or is otherwise coupled to the software, routines, hardware and/or driver devices necessary for authenticating device 300 with regard to the presence of device 300 on a particular network or access to particular services and/or access to data at remote location (e.g., a desktop computer or enterprise server, communication management system 110 and/or data aggregation server 210). Authentication module 355 may work in conjunction with SIP Stack (not shown) and/or identity module 340 with regard to performing authentication routines and/or accessing network services including communication system 110 and/or data aggregation server 210. Authentication module 355 may, in some embodiments, further operate with one or more other modules present at device 300 such as synchronization module 305, and encryption and decryption modules 315 and 325. Authentication module 355 may further operate with server- or network-side applications such as an IP or SIP Gateway or access module.

Authentication module 355 may rely on pre-call validation wherein the MIN and ESN of the device 300 are verified before a call is processed (i.e., before a call is originated or received). Authentication module 355 may utilize a challenge/response process as governed by the Cellular Authentication and Voice Encryption (CAVE) algorithm. A mobile device seeking access to a particular network inputs several parameters into the CAVE algorithm and transmits the result to a Mobile Switching Center (MSC), which controls the switching elements of a cellular system; the MSC makes the same calculations and compares the results. If the results match then the device 300 is deemed authentic and to have legitimate access to the network; if the results do not reconcile with one another (e.g., in the instance of a cloned phone), device 300 is denied access.

Additional authentication methodologies may be utilized by authentication module 355 including Radio Frequency (RF) Fingerprinting. Just as no two human fingerprints are exactly identical, transmission characteristics vary slightly between individual cellular phones. Technical details such as phase noise and harmonic spectra can uniquely identify a particular cell phone transmitter. By checking this transmitter signature against a known good signature, an RF fingerprinting system can determine whether a cell phone trying to place a call is authentic or an impostor.

Browser module 360 comprises or is otherwise coupled to the software, routines, hardware and/or driver devices necessary for enabling web browsing in a mobile device, for example, HTML and XHTML browsers. Browser module 360 may operate in conjunction with rich media module 350 to the extent a browser enabled by the browser module 360 is utilized to access a web page comprising rich media, for example, streaming media. Browser module may implement certain functionalities disclosed in commonly owned and co-pending U.S. patent application Ser. Nos. 11/123,540; 11/227,013; 11/227,272; and Ser. No. 11/227,323.

Browser module 360 may utilize the Wireless Application Protocol, an open international standard for applications that use wireless communication and that allows for small, consumer-class wireless devices to access the Internet. As wireless devices do not typically need a complete web browser implementation to provide web access, a WAP gateway (195) provided by a network service provider may act as a go-between with a Hyper Text Transfer Protocol server to reduce the amount of data that needs to be sent to the device 300 by offloading computational requirements from the phone to the gateway.

For example, through this offloading methodology, only the fundamental elements of a web page will be transmitted to device 300 whereby the total number of bytes of data transmitted is reduced. The gateway may identify these fundamental elements by identifying Wireless Markup Language (WML) or Wireless Extensible Markup Language (WXML) tags embedded in the web page accessed. Once nonessential data has been stripped from the web page, the page is sent to the wireless device using a lightweight transport stack such as the Uniform Datagram Protocol (UDP).

Use of the WAP architecture in browser module 360 may further comprise the utilization of sub-protocols such as the WAP application environment (WAE); the session-layer Wireless Session Protocol (WSP); the transaction-layer Wireless Transaction Protocol (WTP); the security-layer Wireless Transport Layer Security (WTLS); and/or the Wireless Datagram Protocol (WDP).

Optional e-mail client 365 comprises or is otherwise coupled to the software, routines, hardware and/or driver devices necessary for enabling e-mail access in device 300. For example, e-mail client 365 allows for access to e-mail messages received in an e-mail architecture such as Microsoft Exchange 5.5 2000, 2003; Lotus Domino R5, R6, R6.5; IMPA4; and POP3 and IMAP-accessible Internet e-mail. In conjunction with other modules, for example the SMS module 330 and encryption and decryption modules 315/325, e-mail client 365 may access e-mail as it arrives at a remote e-mail server or desktop computer that is integrated with or coupled to data management server 210 through, for example, a push and/or pull function.

E-mail client 365 may also allow for traditional user-to-user electronic mail communications, for example, delivery of a message to an e-mail address associated with a particular mobile device rather than the address of a desktop computer where that message is subsequently forwarded to an associated mobile device.

E-mail client 365 may be a client developed for a specific mobile device or operating environment. E-mail client 365 may also be a platform portable client like those disclosed in commonly owned and co-pending U.S. patent application Ser. Nos. 11/123,540; 11/227,013; 11/227,272; and Ser. No. 11/227,323. E-mail client 365 may comprise additional functionalities beyond simple receipt/review and generation/delivery of email. E-mail client 365 may further comprise address book functionality. Such address book/contact functionality and the related contact data (e.g., individuals, their e-mail addresses, phone number and other data) may be directly integrated with the e-mail client 365 or separate memory (not shown) in the device 300. The address book functionality/contact data may also be embodied in a sub- or secondary module coupled to the e-mail client 365 (not shown). In some embodiments, such address book functionality and contact data may be stored remotely, for example, at the communication system 110 or at a server or desktop computer coupled to the device 300 via the communication system 110 and a data connection (e.g., a wireless connection between the communication system 110 and device 300 as well as a related connection between communication system 110 and a server 125 or PC 130.

The address book functionality and contact data may be utilized to create an interactive, networked experience in conjunction with, for example, dynamic aggregation module 370 as further discussed herein. Utilizing contact data may contribute to a community-like experience including enhanced presence, peer-to-peer communication and information sharing/publication.

Dynamic aggregation module 370 comprises or is otherwise coupled to the software, routines, hardware and/or driver devices necessary for enabling access to and interaction with certain other modules at the device 300 (e.g., e-mail client 365) and communication system 110 (e.g., a presence module, location module, calendar module, and groups module like those described in co-pending U.S. patent application Ser. No. 11/217,203) allowing for the dynamic aggregation of information from various users and/or data depositories and the utilization and display of that information for various functionalities. Dynamic aggregation module 370 may be configured to organize, filter and present information from multiple inputs concerning context, relationship and communication means as described in U.S. Provisional Patent Application No. 60/704,781.

Dynamic aggregation module 370 may be a client software application that identifies the device 300 to a communication management system 110 and/or data aggregation server 210. Dynamic aggregation module 370 may further comprise certain software routines necessary to receive instructions or notifications from a communication management system 110 and/or data aggregation server 210 concerning the publication of information (e.g., to translate a received SMS message into an instruction executable by the device). For example, a publisher may provide information to be received by a group of recipients. Communication management system 110 and/or data aggregation server 210 may only communicate (or be able to communicate) the existence of this information (or the Actual information) with those devices comprising a dynamic aggregation module 370 such that the device 300 may receive the information or otherwise function to allow the user to access the published information.

Figure 4:
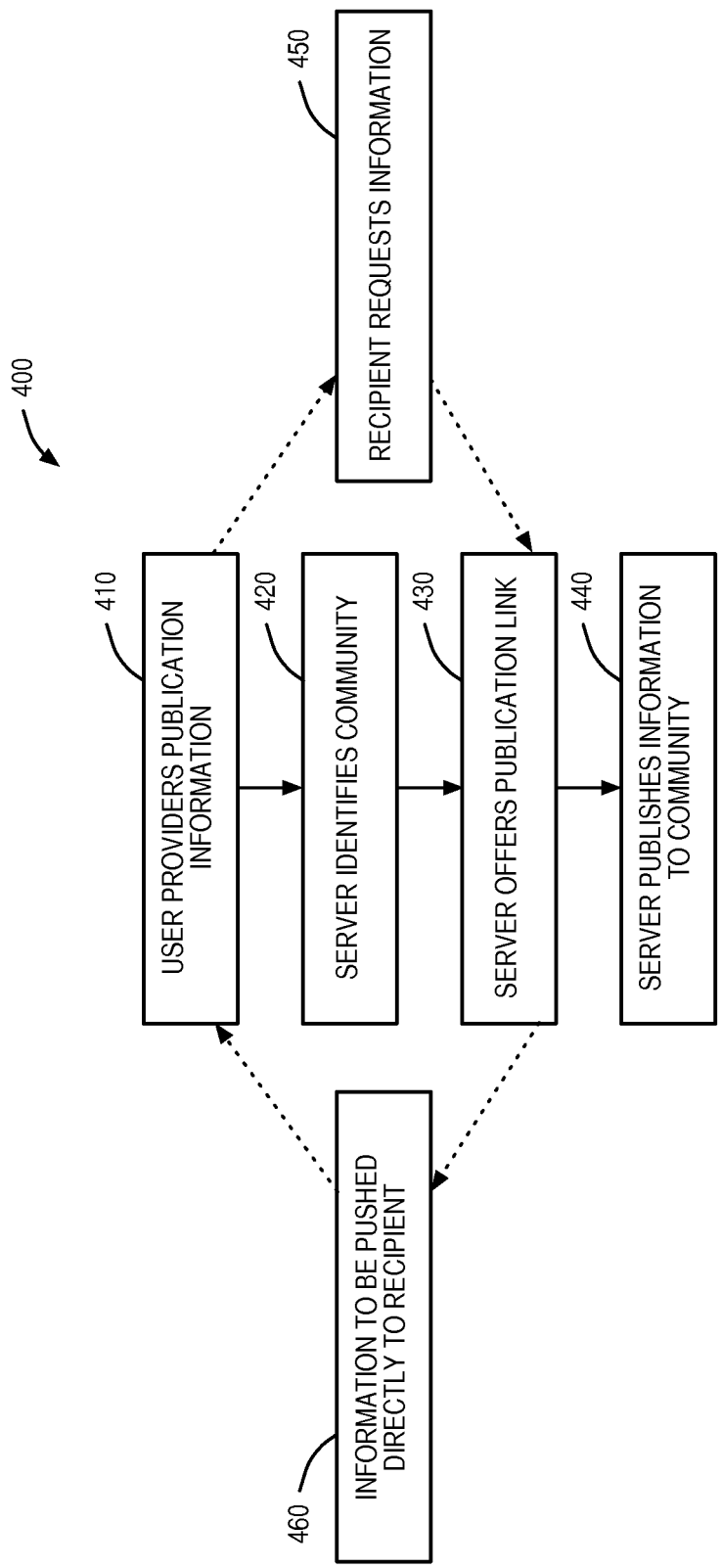
FIG. 4 illustrates an exemplary methodology for publishing data amongst an information community.

Users of client device 300 and/or communication management system 110 can publish PIM data or other forms of data and/or information to one or more users that are a member of an information community made possible by communicative coupling to communication system 110. FIG. 4, for example, illustrates an exemplary methodology 400 for publishing information in an information community. In step 410, a first user (User A) provides certain information to the data aggregation server 210. This information may be pushed to the server 210 or pulled from a PC 115/240 or server 125/230 via a polling operation by the data aggregation server 210.

In step 420, the data aggregation server 210 identifies a particular community. A community may be manually defined by a user and stored at the server 210 (e.g., Group A comprises Users B, C, and D). The data aggregation server 210 may also intelligently identify a community based on, for example, PIM data. For example, User A may be identified as an entry in User B's PIM data and/or vice versa. Other possible communities may be identified based on factors such as common employment, family members and so forth. Specific indicia for the delineation of a community may be set forth by a user for subsequent automated identification by the data aggregation server 210 (e.g., identify all users in a certain zip code).

Once a community has been identified in step 420, the data aggregation server 210 seeks to establish a publication link in step 430. The link may occur automatically or may be subject to the data aggregation server 210 querying whether to make/accept the link in addition a number of other security limitations. For example, the data aggregation server 210 may seek to establish a link between User A and User B based on a community relationship based on a particular correlation or match in, for example, PIM data. User B may be queried by the data aggregation server 210 with regard to whether User B wishes to accept the link and the information related thereto.

Similarly, User A may be queried as to whether to offer User B the link. For example, User B may have been identified as being a part of a community based on employment information derived from PIM data in User A's contact information. It might be the case that User B is no longer employed by the same company as User A and User A has not updated their contact information to reflect the termination. By offering User A the option of offering the link to User B, the inadvertent publication of proprietary information to User B may be avoided.

The link may also be subject to the existence of certain security limitations. For example, if User B cannot establish a communicative link with, for example, data aggregation server 210 and/or communication management system via a secured communication channel (e.g., utilizing a SSL or VPN), then the link may be automatically denied. Alternatively, the user may be informed of the absence of certain security precautions via a server generated notification informing them of the requisite security requirements and a means to re-establish the link once those requirements have been met (e.g., a hyperlink or SMS address).

The order of establishing the link may be concurrent (e.g., User A and User B are both informed of the attempt to establish the link at the same time by the server 210) or occur subject to approval by one of the two parties (e.g., User A must accept the data aggregation server's 210 attempt to establish the link prior to the link being offered to User B). The order of offering these links may also be subject to the confirmation of certain security precautions. For example, offering the link to User B when User B does not possess the requisite security credentials would be moot.

In an alternative embodiment (step 450), instead of the data aggregation server 210 identifying a correlation in the PIM data, a user of the data aggregation and publication service offered by the data aggregation server 210 may specifically request certain publication information. For example, one user may be aware that a second user has recently updated certain information under their control (e.g., a blog). That user may specifically request the delivery (publication) of the information from that user. In such a cases, the link is established—subject to the aforementioned optional security limitations and user approvals in step 430 and the data is published in step 440.

In yet another embodiment (step 460), publication information is pushed to targeted recipients. For example, a user may wish for family members to have immediate access to recently published information (e.g., a blog entry). In this embodiment, the provider of the publication data may directly target desired recipients of the data so that the recipients may immediately receive and review the published data from the server. The targeted link may be subject to the aforementioned acceptance and security protocols as discussed in the context of other embodiments (step 430) and the data is then published in step 440.

Publication information may be a variety of different types of information. For example, the information may be related to calendar data. A professor may, for example, wish to publish their calendar to reflect the availability to meet with students in the professor's class. Similarly, a doctor may wish to publish their availability to see patients. This calendar information may be published, in accordance with the various embodiments as set forth in FIG. 4.

Publication information, by further example, may also be a blog (i.e., a web-log). A blog is, typically, a journal or newsletter that is frequently updated and intended for the general public consumption. Blogs typically represent the personality of the author or a particular web site. Once the owner of the blog has made a new entry to their blog (e.g., a new entry for a particular data and/or time), the new blog entry may be published to users through the various methodologies disclosed in FIG. 4.

Publication information may also be a set of pictures. For example, a user may have recently traveled on vacation and taken a series of pictures of the locales visited. That user may wish to make those photos available to various members in their information community. Those photos may be published in accordance with the various methodologies set forth in the context of FIG. 4.

Publication information is meant to be inclusive rather than exclusive. The aforementioned examples of calendar, blog and photo data/information are, therefore, exemplary and not meant to be interpreted as limitations as to the scope of the present invention.

Published information may be subject to read/write access. Recipients of information published in the context of the present invention may be able to only read the published information or, alternatively, to edit or write to the information. For example, in the professor-student calendar example, students may be able to sign up for particular blocks on the professor's schedule. To sign up for these blocks of time will require write access. Similarly, in the blog example, recipients may respond to a particular blog entry and share their point of view or comment on the entry made by the user publishing the blog. Posting a response, too, would require write access.

In this regard, read/write access can be granted to all recipients, none of the recipients or a particular group of recipients. That group of recipients having read/write access may be classified as members. Membership may be based on any set of requirements as set forth by the publishing user (e.g., family members, selected friends, associates at work, etc.). Membership may also be subject to requests to join the membership group or invitations sent to prospective members. For example, a user who is aware of the content but not able to access the content may request the ability to view that content of the publishing user in a manner similar to that described in step 450 of FIG. 4. Alternatively, a publishing user may send a voice SMS or other communication to a recipient inviting them to join the group in a manner similar to that described in step 460 of FIG. 4 Invitations may also be sent as the result of the data aggregation server identifying a community as noted in step 420 as described in the context of FIG. 4.

The published data—that is, the actual content—may be sent to recipients or, alternatively, a notification of the availability of published data may be sent to the recipients. For example, in the instance that the publication data happens to be digital photographs, the size of these files may consume a considerable amount of bandwidth. Bandwidth consumption may be of issue when the user happens to be accessing data via a bandwidth constricted network (e.g., a wireless network) or pays for consumed bandwidth (e.g., payment per MB of data transferred over the network). The user, after having received the notification, may then access the published data on a more bandwidth-enabled network (e.g., a home computer with a DSL connection).

The notification, in this example, may be an SMS message, an e-mail message, a voice-SMS message, a voice mail or any other form of communication that is capable of being delivered to the various intended recipients over a communications network. The message may provide instructions for accessing the published data or, in the case of an e-mail or SMS message, provide a link for directly gaining access to the content (e.g., a hyperlink).

In some embodiments of the present invention, the content or notification may be transmitted directly to targeted recipients following the establishment of a link by the data aggregation server 210. That is, the server 210 identifies a community in a manner like that described in step 420 of FIG. 4 and offers the establishment of a link in step 430. Instead of the server publishing the information like that described in step 440 of FIG. 4, the publishing user may then deliver the content directly to the recipient via the link established by the data aggregation server 210. That is, the actual content bypasses the aggregation server 210 but is delivered to a user as identified by the server 210.

Alternatively, the published data or notification may be provided by the publishing user directly to the server 210. The server 210 may, via the links as established in, for example, step 430, then deliver to the content to the users in step 440 as previously described.

While the present invention has been described in connection with a series of preferred embodiments, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

The invention claimed is:

1. A data aggregation server adapted to establish one or more publication links between users of an information service, comprising:
   a memory operable to host personal information associated with the users of the information service, the personal information including data indicating one or more communities of which a user is a part and further including data indicating one or more publication links that have been established between users; and
   a hardware processor operable to:
      pull personal information from an electronic device that is communicatively coupled to the data aggregation server,
         wherein the pulled personal information includes personal information associated with a first user that was not provided by the first user during a registration process for the information service;
      determine one or more community relationships between the first user and one or more other users,
         wherein the determination of community relationships is based on a correlation between the personal information of the first user and the personal information of the other users;
      select, from a subset of the other users that do not have an established publication link with the first user, a second user to suggest to the first user,
         wherein the selection of the second user is based on at least one determined community relationship between the first user and the second user;
      seek to establish a publication link between the first user and the second user by providing a suggestion to the first user via a client software application associated with the first user,
         wherein the suggestion identifies the second user and the publication link defines an association between the first user and the second user such that the first user is provided access to publication information published by the second user and the second user is provided access to publication information published by the first user; and
      after the publication link between the first user and the second user has been established, push publication information published by the second user to the first user via the client software application associated with the first user such that the first user is provided immediate access to the publication information.

2. The data aggregation server of claim 1, wherein the hardware processor is further operable to:
   provide to the second user, via a client software application associated with the second user, an option to establish a publication link between the first user and the second user in response to receiving a request from the first user to establish said publication link;
   establish said publication link in response to receiving approval from the second user to establish said publication link; and
   update the personal information of the first user and the personal information of the second user to reflect the established publication link.

3. The data aggregation server of claim 1, wherein the suggestion further indicates a basis for the selection of the second user.

4. The data aggregation server of claim 1, wherein the second user is selected because the first user and the second user are members of the same community.

5. The data aggregation server of claim 1, wherein the second user is selected because the first user and the second user each have an established publication link in common with a third user.

6. The data aggregation server of claim 1, wherein:
   the memory is further operable to host publication information associated with the users of the information service, the publication information including one or more photographs; and
   the hardware processor is further operable to provide at least some of the publication information associated with the second user to the first user via a client software application associated with the first user.

7. A method for establishing a publication link between users of an information service, comprising:
   hosting, by a data aggregation server, personal information associated with the users of the information service, the personal information including data indicating one or more communities of which a user is a part and further including data indicating one or more publication links that have been established between users;
   pulling, by the data aggregation server, personal information from an electronic device that is communicatively coupled to the data aggregation server,
      wherein the pulled personal information includes personal information associated with a first user that was not provided by the first user during a registration process for the information service;
   determining, by the data aggregation server, one or more community relationships between the first user and one or more other users,
      wherein the determination of community relationships is based on a correlation between the personal information of the first user and the personal information of the other users;
   selecting, by the data aggregation server, a second user to suggest to the first user from a subset of the other users that do not have an established publication link with the first user,
      wherein the selection of the second user is based on at least one determined community relationship between the first user and the second user;
   seeking to establish, by the data aggregation server, a publication link between the first user and the second user by providing a suggestion to the first user via a client software application associated with the first user, wherein the suggestion identifies the second user and the publication link defines an association between the first user and the second user such that the first user is provided access to publication information published by the second user and the second user is provided access to publication information published by the first user; and after the publication link between the first user and the second user has been established, pushing, by the data aggregation server, publication information published by the second user to the first user via the client software application associated with the first user such that the first user is provided immediate access to the publication information.

8. The method of claim 7, wherein the suggestion further indicates a basis for the selection of the second user.

9. The method of claim 7, wherein the second user is selected because the first user and the second user are members of the same community.

10. The method of claim 7, wherein the second user is selected because the first user and the second user each have an established publication link in common with a third user.

11. A system for establishing one or more publication links between users of an information service, comprising:
a data aggregation server adapted to:
host personal information associated with the users of the information service, the personal information including data indicating one or more communities of which a user is a part and further including data indicating one or more publication links that have been established between users;
pull personal information from an electronic device that is communicatively coupled to the data aggregation server,
wherein the pulled personal information includes personal information associated with a first user that was not provided by the first user during a registration process for the information service;
determine one or more community relationships between the first user and one or more other users,
wherein the determination of community relationships is based on a correlation between the personal information of the first user and the personal information of the other users;
select, from a subset of the other users that do not have an established publication link with the first user, a second user to suggest to the first user,
wherein the selection of the second user is based on at least one determined community relationship between the first user and the second user; and
after a publication link between the first user and the second user has been established, push publication information published by the second user to the first user via a client software application associated with the first user such that the first user is provided immediate access to the publication information; and
a client software application adapted to:
provide a suggestion to the first user identifying the second user selected by the data aggregation server;
provide an option to the first user to attempt to establish a publication link between the first user and the second user,
wherein the publication link defines an association between the first user and the second user such that the first user is provided access to publication information published by the second user and the second user is provided access to publication information published by the first user; and
display, for viewing by the first user, publication information published by the second user after said publication link has been established.

12. The system of claim 11, wherein the suggestion further indicates a basis for the selection of the second user.

13. The system of claim 11, wherein the second user is selected because the first user and the second user are members of the same community.

14. The system of claim 11, wherein the second user is selected because the first user and the second user each have an established publication link in common with a third user.

* * * * *